US006567112B2

(12) United States Patent
Suzuki

(10) Patent No.: US 6,567,112 B2
(45) Date of Patent: May 20, 2003

(54) THERMAL TRANSFER RECORDING APPARATUS AND ITS RECORDING METHOD

(75) Inventor: Yoshitaka Suzuki, Sugito-machi (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 47 days.

(21) Appl. No.: 09/879,923

(22) Filed: Jun. 14, 2001

(65) Prior Publication Data

US 2001/0052923 A1 Dec. 20, 2001

(30) Foreign Application Priority Data

Jun. 16, 2000 (JP) ....................................... 2000-181139

(51) Int. Cl.[7] ................................................ G01D 15/16
(52) U.S. Cl. ....................................................... 347/217
(58) Field of Search ................................ 347/217, 223, 347/197, 170, 171, 173; 346/105; 242/334.3

(56) References Cited

U.S. PATENT DOCUMENTS 4,675,698 A * 6/1987 Tsutsumi .................... 346/105
4,788,558 A * 11/1988 Caldwell et al. ......... 242/334.3
5,775,820 A * 7/1998 Sugimoto et al. ........... 347/197
6,046,756 A * 4/2000 Iga et al. ..................... 347/173
6,142,686 A * 11/2000 Schanke et al. ............ 400/223
6,236,420 B1 * 5/2001 Matsuzaka .................. 347/170

* cited by examiner

*Primary Examiner*—Lamson Nguyen
*Assistant Examiner*—K. Feggins
(74) *Attorney, Agent, or Firm*—Connolly Bove Lodge & Hutz LLP

(57) ABSTRACT

Ink on a ink film 1 wound around a first supply reel 5, which is driven by a first DC motor 21, is transferred to an intermediate recording medium 7 wound around a second supply reel 8, which is driven by a first stepping motor 31, in a first heating section 500. While transferring the ink on the ink film 1 to the intermediate recording medium 7 in the first heating section 500, the ink is transferred with rewinding the ink film 1 and the intermediate recording medium 7 by the first supply reel 5 and the second supply reel 8 respectively.

4 Claims, 7 Drawing Sheets

THERMAL TRANSFER RECORDING APPARATUS AND ITS RECORDING METHOD

BACKGROUND OF THE INVENTION

1. Field of the Invention

The present invention relates to a thermal transfer recording apparatus and its recording method, particularly, relates to a recording method of thermal transfer recording apparatus, which transfers ink having meltability or sublimeness to a recording medium and forms an ink image on a recording medium being extended between a supply reel and a take-up reel.

2. Description of the Related Art

There existed a re-transferring method such that an ink image is once formed on an intermediate recording medium, and then the ink image is transferred to a recording medium. A card recording apparatus utilizing such the re-transferring method has been well known and various ideas have been proposed. FIG. 7 shows a constitution of such a card recording apparatus.

In FIG. 7, the card recording apparatus is composed of an ink film 253 of which a base film in a tape shape is coated with meltable ink or sublimation ink being extended between a first supply reel 251 and a first take-up reel 252, an intermediate recording medium 256 being extended between a second supply reel 254 and a second take-up reel 255, a heating section 257 for transferring ink on the ink film 253 to the intermediate recording medium 256, a platen roller 259 for holding the ink film 253 and the intermediate recording medium 256 in conjunction with a thermal head 258 constituting the heating section 257, and another heating section 263, which is composed of a heat roller 261 and another platen roller 262, for transferring an ink image being transferred to the intermediate recording medium 256 to a recording medium 260.

The ink film 253 and the intermediate recording medium 256 being directly contacted with each other is transported to the heating section 257, wherein ink on the ink film 253 is heated by the thermal head and an ink image is formed on the intermediate recording medium. The intermediate recording medium 256 formed with the ink image is transported to the other heating section 263, wherein the ink image formed on the intermediate recording medium 256 is transferred to the recording medium 260.

The first supply and take-up reels 251 and 252 utilized for transporting the ink film 253 and the second take-up reel 255 utilized for transporting the intermediate recording medium 256 is driven by a DC (direct current) motor. The second supply reel 254 for transporting the intermediate recording medium 256 is driven by a stepping motor.

A stepping motor is a motor of which rotation is controlled by a number of pulses inputted. By using such a stepping motor to drive the second supply reel 254 for the intermediate recording medium 256, an amount of transportation of the intermediate recording medium 256 can be accurately controlled.

Nevertheless, in a case that the second take-up reel 255 for transporting the intermediate recording medium 256 is driven by a DC motor, a rotation speed of the DC motor becomes unstable when the DC motor starts to rotate. Therefore, there existed a problem such that an ink image transferred to the intermediate recording medium 256 is suffering from irregularity in depth. In other words, a DC motor is unstable in rotation, so that an ink image is easily suffering from a problem of irregularity in depth when the DC motor starts to rotate even though the second supply reel 254 is accurately controlled to drive.

FIG. 8 shows a rotation speed of a DC motor when the DC motor is activated to start. As shown in FIG. 8, a rotation speed is not stable for some period of time after the DC motor started to rotate. More accurately, delay in speed occurs at a beginning of rotation and a rotation speed once increases more than a regular transfer speed so as to recover a delayed start timing for transferring, and then the rotation speed approaches the regular transfer speed.

In a case that an ink image is formed on the intermediate recording medium 256 by driving the second take-up reel 255 for the intermediate recording medium 256 in accordance with the above-mentioned characteristic of rotation speed, some load resistance generates at the heating section 257 because the platen roller 259 is pressed against the thermal head 258. Accordingly, the take-up roller 255 can hardly take up the intermediate recording medium 256 so much as to be lead out by the second supply reel 254. In addition thereto, when an ink image is transferred to the intermediate recording medium 256 in the heating section 257, the heat roller 261 is separated from the other platen roller 262, so that no load resistance generates in the other heating section 263.

Therefore, slackening the intermediate recording medium 256 at the heating section 257 in the supply reel 251 side causes irregularity in depth of an ink image transferred to the intermediate recording medium 256. It is possible to prevent the intermediate recording medium 256 from slackening if a rotation force of a DC motor driving the take-up roller 255 is increased so as to increase a tension applied to the intermediate recording medium 256. However, generally, a substrate sheet of the intermediate recording medium 256 is extremely thin as thin as less than 25 $\mu$m. Accordingly, there existed another problem such that the intermediate recording medium can not be transported stably due to stretch of the substrate sheet if a tension applied to the intermediate recording medium 256 is increased.

SUMMARY OF THE INVENTION

Accordingly, in consideration of the above-mentioned problems of the prior art, an object of the present invention is to provide a thermal transfer recording apparatus and its recording method, which can transfer an ink image without irregularity in depth.

According to an aspect of the present invention, there provided a thermal transfer recording apparatus comprising: an ink film coated with ink having meltability or sublimeness on a tape shaped base film; a supply reel driven by a stepping motor and wound with unused part of a recording medium in a tape shape; a take-up reel driven by a DC (direct current) motor winding used part of the recording medium; and a transferring section for transferring ink on the ink film to the recording medium by heating the ink film and unused part of the recording medium being contacted with each other, wherein the recording medium is recorded with being rewound by the supply reel while transferring ink in the transferring section.

According to another aspect of the present invention, there provided a recording method of a thermal transfer recording apparatus, which comprises an ink film coated with ink having meltability or sublimeness on a tape shaped base film, a supply reel driven by a stepping motor and wound with unused part of a recording medium in a tape shape, a take-up reel driven by a DC motor winding used part of the recording medium, and a transferring section for transferring ink on the ink film to the recording medium by heating the ink film and unused part of the recording medium being contacted with each other, the recording method comprising steps of: forwarding the ink film from a first supply reel to a second take-up reel and the intermediate recording medium from a second supply reel to a second take-up reel; indexing ink on the ink film and a frame of the intermediate recording medium; adjusting the frame to a head of the ink; rewinding the ink film and the intermediate recording medium by the first and second supply reels respectively; and transferring the ink to the frame in the transferring section by heating the ink film and the intermediate recording medium being contacted with each other while rewinding the ink film and the intermediate recording medium by the first and second supply reels respectively, wherein the steps of forwarding, indexing, adjusting rewinding and transferring are repeated as many times as a number of ink to be transferred.

Other object and further features of the present invention will be apparent from the following detailed description when read in conjunction with the accompanying drawings.

BRIEF DESCRIPTION OF THE DRAWINGS

FIG. 2(*b*) is a partial view of the thermal transfer recording apparatus shown in FIG. 2(*a*) showing an irregular case of transportation of a card to be recorded with an ink image, wherein the card is transported on a slant.

DETAILED DESCRIPTION OF THE PREFERRED EMBODIMENTS

[Embodiment]

Figure 1:
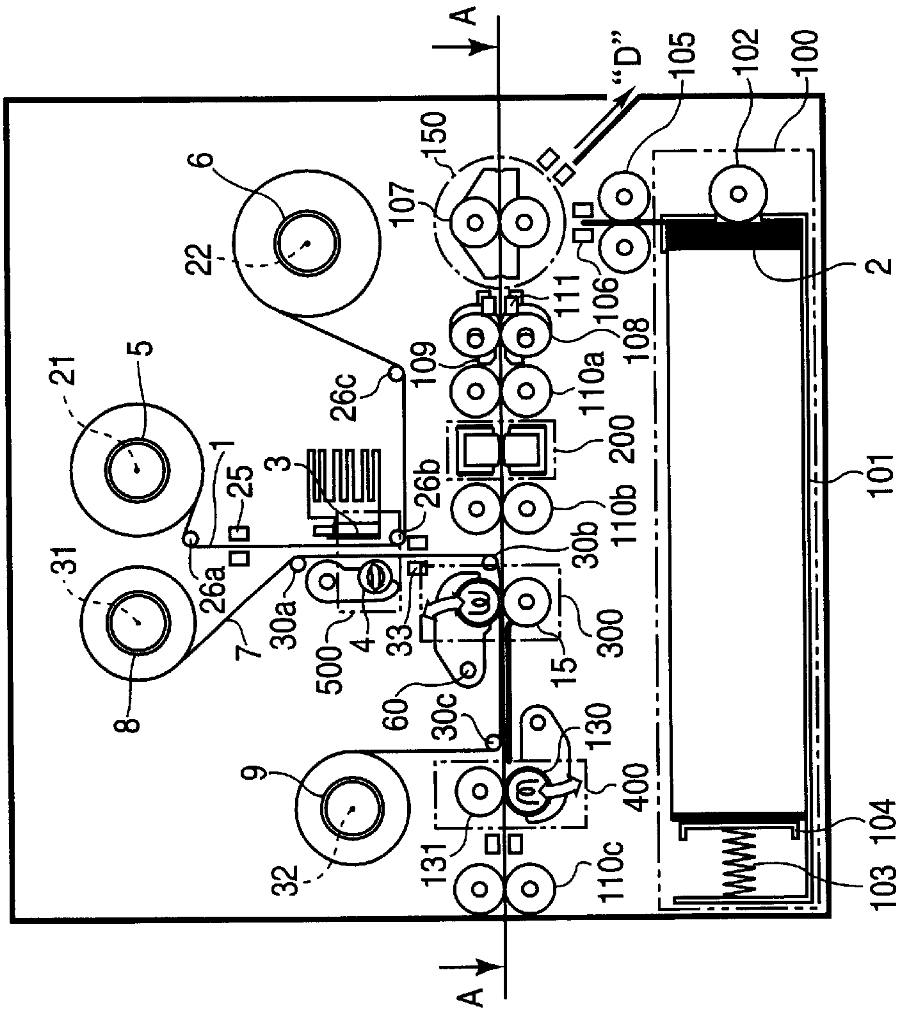
FIG. 1 is a plan view of a thermal transfer recording apparatus according to an embodiment of the present invention.

FIG. 1 is a plan view of a thermal transfer recording apparatus according to an embodiment of the present invention.

Figure 2A:
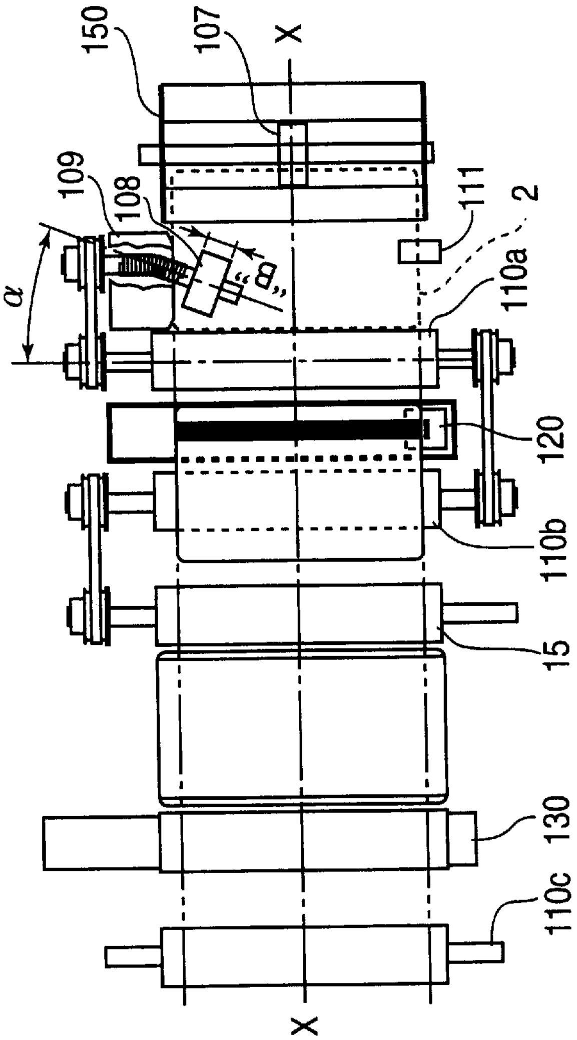
FIG. 2(*a*) is a cross sectional view taken substantially along line A—A of FIG. 1.
Figure 2B:
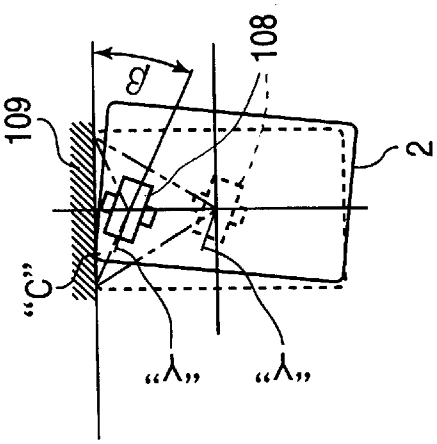

FIG. 2(*a*) is a cross sectional view taken substantially along a line A—A of FIG. 1.

FIG. 2(*b*) is a partial view of the thermal transfer recording apparatus shown in FIG. 2(*a*) showing an irregular case of transportation of a card to be recorded with an ink image, wherein the card is transported on a slant.

Figure 3:
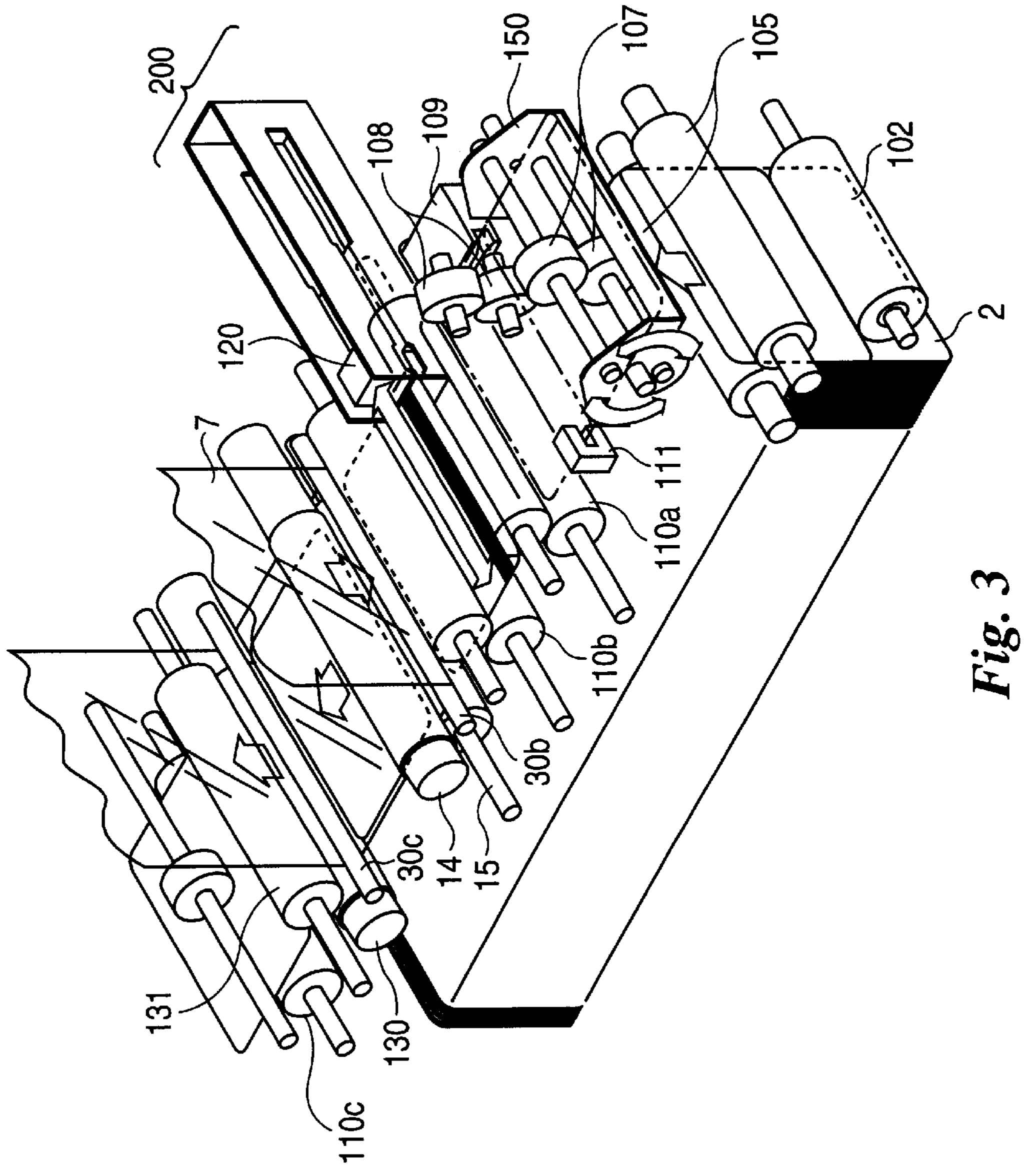
FIG. 3 is a partially cutaway view in perspective taken substantially along line A—A of FIG. 1.

FIG. 3 is a partially cutaway view in perspective taken substantially along the line A—A of FIG. 1.

Figure 4A:
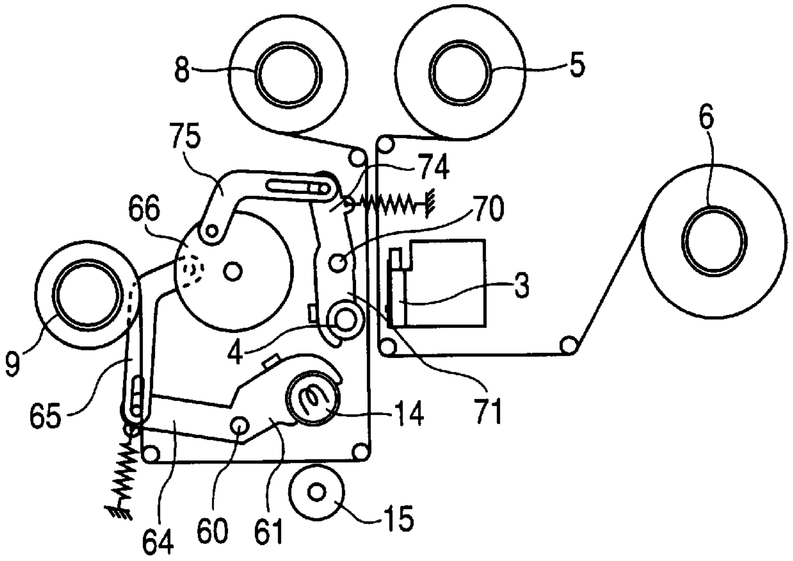
FIGS. 4(*a*) through 4(*c*) show a mode "A" through a mode "C" respectively, each drawing shows mode change of a first and second heating sections of the thermal transfer recording apparatus according to the embodiment of the present invention.
Figure 4B:
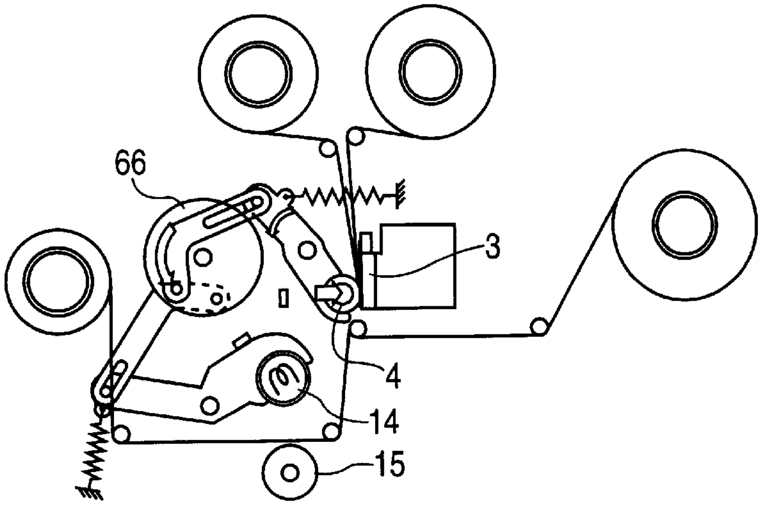
Figure 4C:
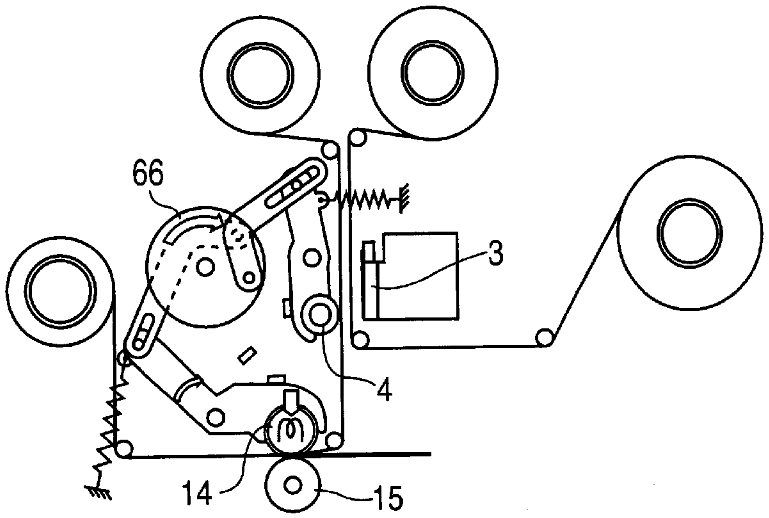

FIGS. 4(*a*) through 4(*c*) show a mode "A" through a mode "C" respectively, each drawing shows mode change of a first and second heating sections of the thermal transfer recording apparatus according to the embodiment of the present invention.

Figure 5:
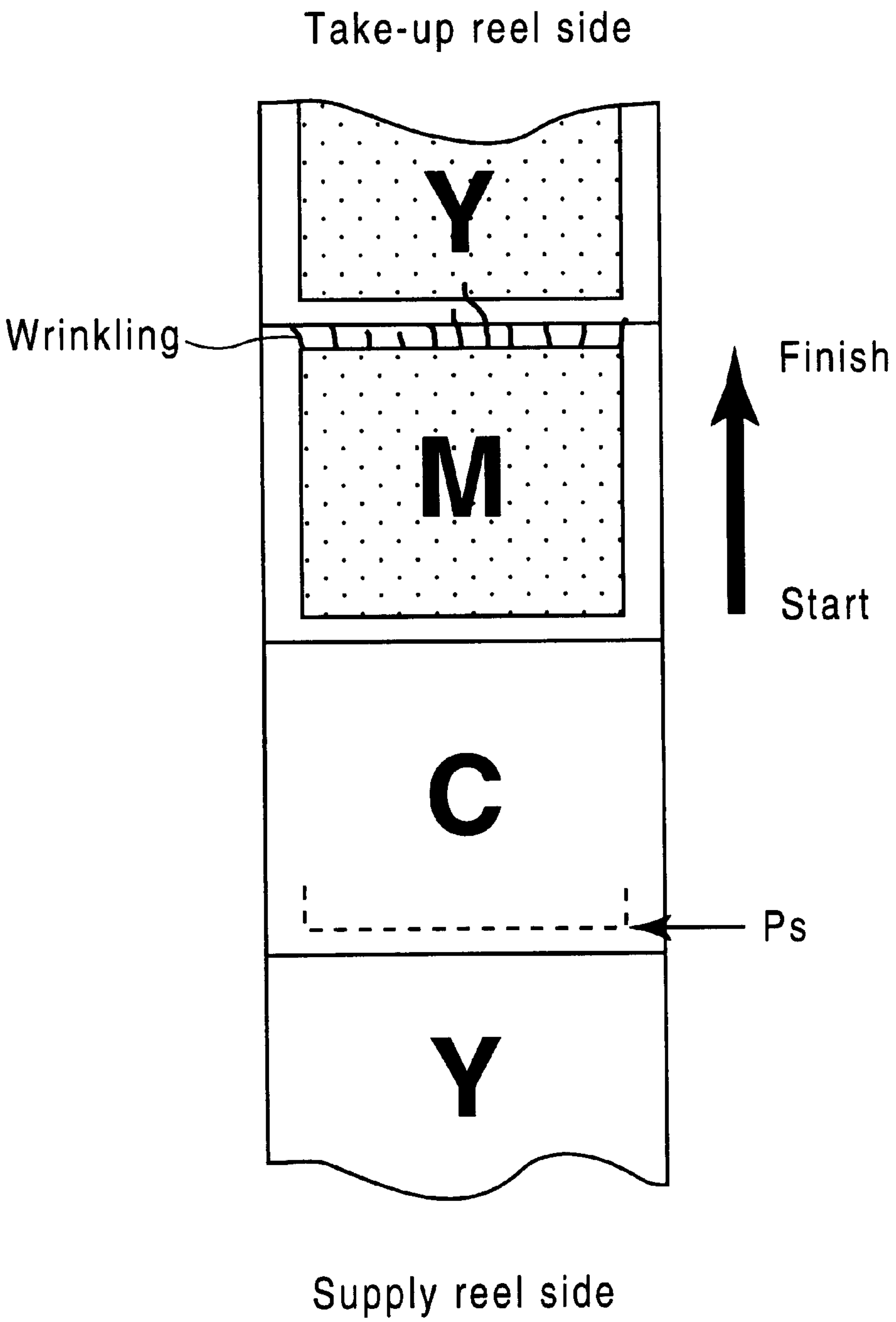
FIG. 5 shows a transfer direction of an ink film in the thermal transfer recording apparatus according to the embodiment of the present invention.

FIG. 5 shows a transfer direction of an ink film in the thermal transfer recording apparatus according to the embodiment of the present invention.

Figure 6:
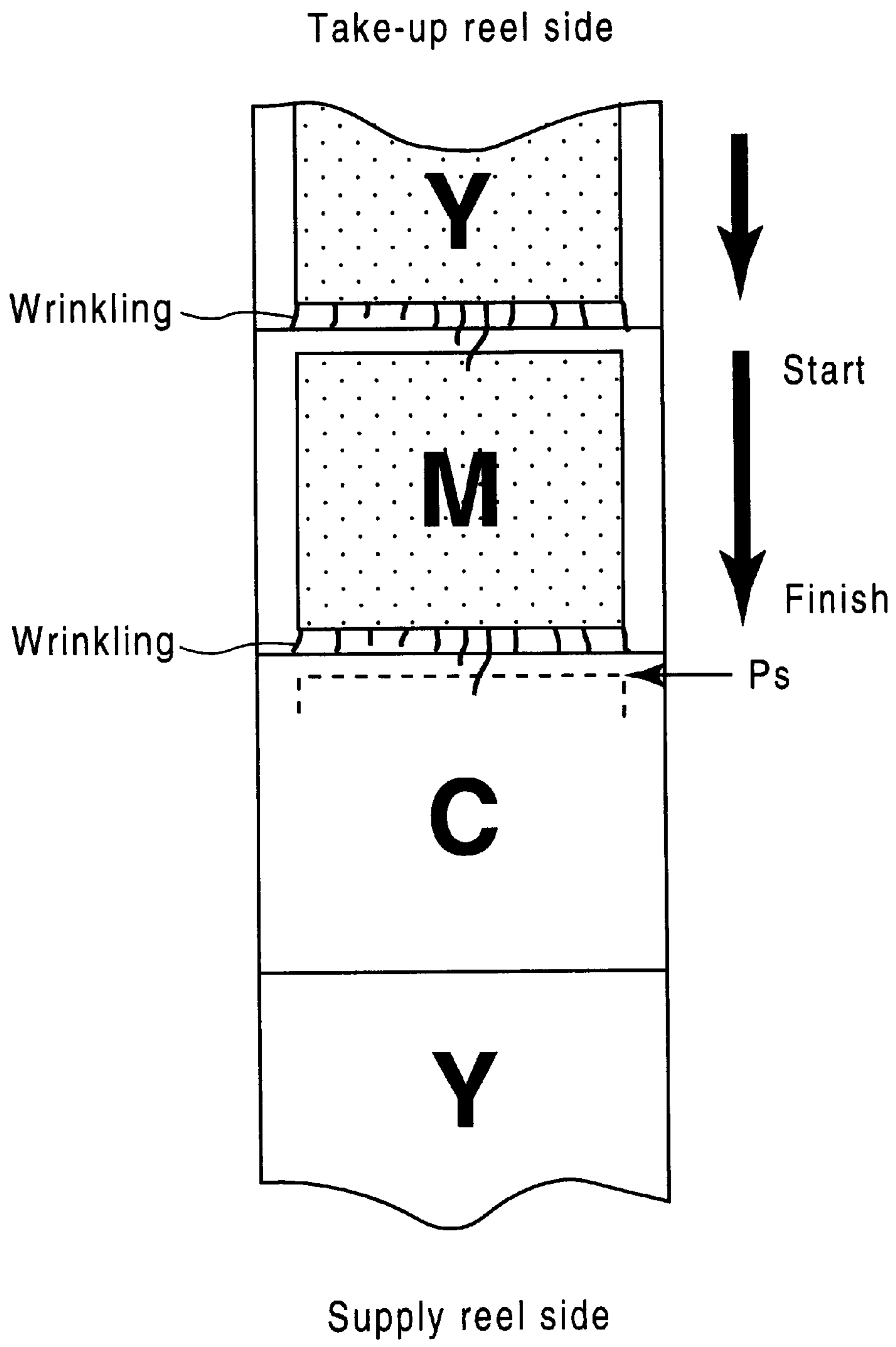
FIG. 6 is a comparative example showing a transfer direction of an ink film in the thermal transfer recording apparatus, wherein the transfer direction is opposite to the transfer direction shown in FIG. 5.
Figure 7:
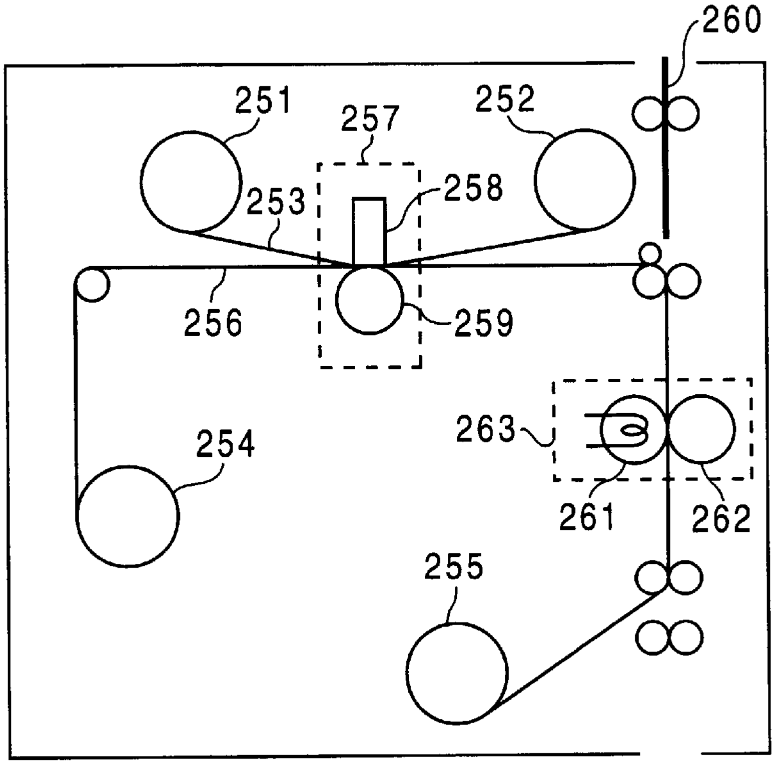
Fig. 7 PRIOR ART
FIG. 7 shows a constitution of a card recording apparatus according to the prior art.
Figure 8:
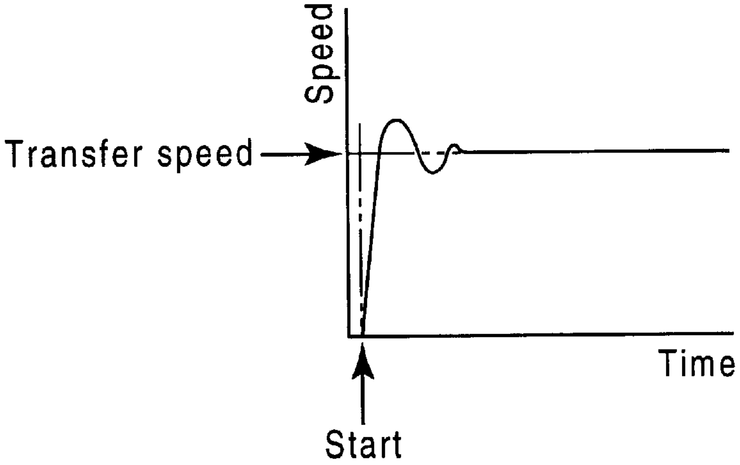
FIG. 8 shows a rotation speed of a DC motor when the DC motor is activated to start.

FIG. 6 is a comparative example showing a transfer direction of an ink film in the thermal transfer recording apparatus, wherein the transfer direction is opposite to the transfer direction shown in FIG. 5.

In FIG. 1, an ink film 1 is extended between a first supply reel 5 and a first take-up reel 6, wherein a surface of the ink film 1 coated with ink faces toward a first platen roller 4. The ink film 1 is coated with meltable or sublimation color ink such that three colors of yellow (Y), magenta (M) and cyan (C) or four colors of yellow (Y), magenta (M), cyan (C) and black (K) are cyclically coated on a base film in a tape shape.

First and second DC (direct current) motors 21 and 22, which are utilized for transporting the ink film 1 as a power source, are connected to the first supply reel 5 and the first take-up reel 6 respectively through a deceleration mechanism (not shown). An encoder (not shown) is installed in the first and second DC motors 21 and 22 respectively. The encoder can detect a rotation angle or a number of revolutions. The first DC motor 21 connected to the first supply reel 5 can drive the first supply reel 5 to an opposite direction to a regular revolving direction of the first supply reel 5 so as to rewind the ink film 1 or so as to apply an appropriate back tension to the ink film 1.

By changing a voltage across the first DC motor 21 in accordance with a residual amount of the ink film 1 at the first supply reel 5, a constant back tension can always be applied to the ink film 1. A residual amount of the ink film 1, which is corresponding to a diameter of the ink film 1 wound around the first supply reel 5, can be calculated by detecting a rotation angle of the first DC motor 21 in response to one frame of the ink film 1 passing through a sensor 25 for indexing ink.

The second DC motor 22 connected to the first take-up reel 6 adds an optimum pulling tension to the ink film 1 by applying a voltage in response to a diameter of the ink film 1 wound around the first take-up reel 6 while recording in conjunction with taking up the ink film 1. Further, the encoder installed in the first or second DC motor 21 or 22 detects a transportation amount of the ink film 1 and controls the transportation amount.

A thermal head 3 constituting a first heating section 500 is firmly allocated in a place toward an outer surface or the base film side (not coated with ink) of the ink film 1 and the first platen roller 4 is allocated in a place facing toward the ink coated surface of the ink film 1, wherein the first platen roller 4 is allocated so as to contact with or separate from the thermal head 3. The sensor 25 for indexing ink is provided in a middle of a path of the ink film 1 so as to index Y color ink on the ink film 1. Indexing a second or above color ink (M, C, or K color ink) is performed by the encoder installed in the first or second DC motor 21 or 22. With respect to the sensor 25, there existed various detection types such as detecting a detection mark or a boundary between colors. Further, the ink film 1 is taken up by the first take-up roller 6 guided through guiding members 26*a* through 26*c*.

An intermediate recording medium 7 is composed of a substrate sheet in a tape shape and a transparent image sensing layer as same constitution as disclosed in the Japanese Patent Laid-open Publication No. 8-175034/1996. Further, the transparent image sensing layer can be peeled off from the substrate sheet. A detection mark is printed on the intermediate recording medium 7 by each frame for recording an image. The intermediate recording medium 7 is extended between a second supply reel 8 and a second take-up reel 9 with facing the transparent image sensing layer toward the ink film 1.

A pulse motor or a first stepping motor 31 being utilized for transporting the intermediate recording medium 7 as a power source is connected to the second supply reel 8 and a third DC motor 32 is connected to the second take-up reel 9 through a deceleration mechanism (not shown) respectively. An encoder (not shown) is installed in the third DC motor 32. The encoder can detect a rotation angle or a number of revolutions.

The intermediate recording medium 7 is led out from the second supply reel 8 and passes through a first guide member 30*a*, the first platen roller 4, a mark sensor 33 for indexing a frame of the intermediate recording medium 7, a second guide member 30*b*, between a first heat roller 14 and a second platen roller 15 constituting a second heating section 300, and a third guide member 30*c* and finally taken up by the second take-up reel 9. Accordingly, ink on the ink film 1 faces toward the transparent image sensing layer of the intermediate recording medium 7 between the thermal head 3 and the first platen roller 4. In addition thereto, the first heat roller 14 can contact with or separate from the second platen roller 15.

Further, with referring to FIGS. 4(*a*) through 4(*c*) in conjunction with FIG. 1, a mode changing of the first heat roller 14 and the first platen roller 4 is explained next. The first heat roller 14 is pressed against and separated from the second platen roller 15 by a rotation of a cam 66 driven by a second stepping motor (not shown). In addition thereto, the first platen roller 4 is pressed against and separated from the thermal head 3 by a rotation of the cam 66.

A driving mechanism of the first platen roller 4 is composed of a first arm 71 provided with the first platen roller 4 on one end, a first pivot 70 being a spindle of the first arm 71, a second arm 74 for pivoting the first pivot 70, a first link 75 for transmitting torque to the second arm 74, and the cam 66, which converts torque to projectile force and transmits the projectile force to the first link 75. The cam 66 is rotated by the second stepping motor (not shown) through a deceleration mechanism (not shown). On the other hand, a driving mechanism of the first heat roller 14 is composed of a third arm 61 provided with the first heat roller 14 on one end, a second pivot 60 being a spindle of the third arm 61, a fourth arm 64 for pivoting the second pivot 60, a second link 65 for transmitting torque to the fourth arm 64, and the cam 66, which converts torque to projectile force and transmits the projectile force to the second link 65. As mentioned above, the cam 66 makes the first platen roller 4 and the first heat roller 14 contact with or separate from the thermal head 3 and the second platen roller 15 respectively by changing a phase of the cam 66. Accordingly, each phase of the cam 66 corresponds to three modes A, B and C shown in FIGS. 4(*a*) through 4(*c*) respectively.

In the mode A shown in FIG. 4(*a*), the first heat roller 14 is separated from the second platen roller 15 and the first platen roller 4 is also separated from the thermal head 3. In the mode B shown in FIG. 4(*b*), the first heat roller 14 is separated from the second platen roller 15. However, the first platen roller 4 is pressed against the thermal head 3. In the mode C shown in FIG. 4(*c*), while the first heat roller 14 is pressed against the second platen roller 15, the first platen roller 4 is separated from the thermal head 3.

With referring to FIGS. 2(*a*), 2(*b*) and 3 in conjunction with FIG. 1, a construction and operation of transporting a recording medium in a card transporting section of the thermal transfer recording apparatus (hereinafter referred to a card recording apparatus) according to the present invention is depicted. In FIG. 1, a plurality of recording mediums 2 (hereinafter referred to card 2) is packed in a hopper section 100 with placing a longitudinal direction of the card 2 horizontally, wherein a lateral direction of the card 2 is indicated by a thick vertical line in FIG. 3. The hopper section 100 is composed of a case 101 being packed with a plurality of cards 2, wherein the case 101 is provided with a gate for feeding out the card 2 one by one, a pick-up roller 102 for transporting the card 2, and a combination of a spring 103 and a pusher 104 utilized for pushing the card 2 toward the pick-up roller 102. Further, the hopper 100 can be drawn out from the thermal transfer recording apparatus when loading the card 2 in the case 101.

The construction of transporting the card 2 is further composed of a pair of cleaning rollers 105 for removing dust and dirt attached on a surface of the card 2, a card sensor 106 for detecting the card 2 being fed out from the hopper section 100, a card turning around section 150 provided with a pair of first card carrier rollers 107, wherein the pair of first card carrier rollers 107 rotates totally so as to change an advancing direction of the card 2. The card turning around section 150 has following rotation phases:

1) Receiving the card 2 being fed out from the hopper section 100,
2) Forwarding the card 2 to a succeeding carrier roller,
3) Turning the card 2 upside down, and
4) Exhausting an encoding error card in an information recording section to an arrow direction "D". The card turning around section 150 can perform the above-mentioned 4 modes.

Further, the card turning around section 150 is allocated in an outermost side of the card recording apparatus, so that an encoding error card can be exhausted without any extra components by slanting an outlet for an encoding error card to the direction shown by the arrow "D" in FIG. 1.

With referring to FIGS. 2(*a*) and 2(*b*) in conjunction with FIG. 1, a transportation path for the card 2 succeeding the card turning around section 150 is depicted. A second card carrier roller 108 is installed in an angle "$\alpha$" of 10 to 40 degrees inclined to a center axis of each axis of rotation of third, fourth and fifth card carrier rollers 110*a*, 110*b* and 110*c*. Further, a contacting length with the card 2 or a roller width "B" of the second card carrier roller 108 is less than 15 mm. Furthermore, the second card carrier roller 108 is allocated so as to contact with the card 2 in an area divided by a center line X—X of the card, which is perpendicular to a longitudinal direction of the card and is in a same direction as the card transporting path, and adjacent to a card guide 109 as shown in FIG. 2(*a*).

By arranging the second card carrier roller 108 as mentioned above, the card 2 can be transported smoothly even though the card 2 is forwarded in the lateral direction. In other words, even in a case that the card 2 is transported slantingly and the slanted card 2 is reformed its posture such that a corner "C" of the card 2 is contacting with the card guide 109 as shown in FIG. 2(*b*), the smaller both an angle "$\beta$" shown in FIG. 2(*b*) and the roller width "B" of the second carrier roller 108 are, the card 2 can rotate smoothly with centering the corner "C" of the card 2. Further, even in a case of a thinner card, buckling of the thinner card may hardly happen. A further detail is explained as follows. In a case that the contacting length "B" with the card 2 becomes larger, a card transporting force "Y" increases. However, a force preventing the card 2 from rotating for reforming a posture of the card 2 increases. Accordingly, reaction such as hurting the corner "C" of the card 2 may happen.

As mentioned above, the card 2, which is reformed its posture and positioned correctly, is transferred to the third card carrier roller 110*a*. When a card detecting sensor 111 detects a rear end of the card 2, a card transporting motor (not shown) stops rotating at a predetermined number of counts by counting a number of steps of a stepping motor as the card transporting motor.

The number of counts is determined by a location of an information recording section 200 including a magnetic head 120 or like and a location of a magnetic stripe of the card 2 or a terminal location of an IC card having an external terminal, and further, a card direction of the card 2 or an IC card arranged in the hopper section 100. Accordingly, a stopping position of the card 2 is maintained at a position at where the card 2 is held by the third card carrier roller 110*a* or the fourth card carrier roller 110*b*.

In addition thereto, the third and fourth card carrier rollers 110*a* and 110*b* are an elastic body having a larger coefficient of friction such as rubber having a nip covering all over an area corresponding to the longitudinal direction of the card 2, so that the card 2 can be secured while recording information, and vibration of the card 2 can be reduced while recording the information. Accordingly, information can be recorded on the card 2 in high reliability.

The information recording section 200 is provided with a combination of two out of three components such that two types of magnetic heads, which cope with the type I and the type II regulated by the Japanese Industrial Standard JIS X6302 (Magnetic Information Recording Method of Credit Card having Magnetic Stripe) and a contact coping with the JIS X6303 (Physical Characteristics of IC Card having External Terminal) with allocating them at upper and lower positions in the card transporting path, or only one component can be allocated in the card transporting path.

With respect to a contact coping with the JIS X6303, the contact is contacted with an external terminal of the card 2 and an information is recorded or reproduced after the card 2 is stopped at a predetermined position. In other cases except for recording or reproducing, the contact is evacuated from the card 2 above the card transporting path. A magnetic information recording and reproducing method of magnetic head is such that the magnetic head 120 scans along a magnetic stripe of the card 2 after the card 2 is stopped at the predetermined position.

A card, which can not be recorded and reproduced in the information recording section 200, is returned back to the card turning around section 150 and exhausted from the outlet for encoding error card. The card 2 completed recording and reproducing information is transferred to the second heating section 300. In the second heating section 300, the card 2 is inserted between the first heat roller 14 and the second platen roller 15 with facing toward an ink image on the intermediate recording medium 7, the card 2 and the intermediate recording medium 7 is heated and pressurized, and then the ink image on the intermediate recording medium 7 is transferred to the card 2.

A distance from a nip position of the first heat roller 14 and the second platen roller 15 to the third guide member 30*c* is designated to be larger than a length of the card 2 in the lateral direction. A reason is such that it is experientially known that peeling a substrate sheet of the intermediate recording medium 7 from the card 2 in a lower temperature as low as possible after transferred obtains a satisfactory result. By designating the distance as mentioned above, the card 2 is sufficiently cooled down by stopping the card 2 for a predetermined period of time after the rear end of the card 2 passes the nip position. Accordingly, an excellent transferring can be performed.

The card 2 to which the ink image is transferred is transported with being attached to the intermediate recording medium 7 and separated from the intermediate recording medium 7 at a potion of the third guide member 30*c*, and then transmitted to a card warp correction section 400 in a succeeding process. The card warp correction section 400 is provided with a second heat roller 130 similar to the first heat roller 14 provided in the second heating section 300 in configuration-wise and a third platen roller 131, wherein the second heat roller 130 is allocated with facing toward a surface opposite to the surface on which the ink image is transferred and can contact with and separate from the third platen roller 131. The second heat roller 130 is utilized for applying heat on the opposite surface of the card 2, which is thermally distorted while transferring the ink image in the second heating section 300, and for eliminating the distortion. The card 2 passing through the card warp correcting section 400 is exhausted to an outside of the card recording apparatus through the third guide roller 110*c*.

As mentioned above, the card transporting section is composed of the hopper section 100 for feeding the card 2 upward approximately vertical direction one by one with forwarding the lateral direction of the card 2 toward the transporting direction, wherein the hopper section 100 is allocated in the lowermost area of the card recording apparatus, the card turning around section 150 for holding the card 2 fed out from the hopper section 100 and for changing the transporting direction of the card 2, the information recording and reproducing section 200 for stopping the card 2 carried out from the card turning around section 150 at the predetermined position, and the second heating section 300 for transferring an ink image on the card 2 in order, wherein all of the card turning around section 150, the information recording and reproducing section 200 and the second heating section 300 are allocated above the hopper section 100.

With referring back to FIG. 1, a process of forming an ink image on the intermediate recording medium 7 and transferring the ink image on the card 2 is detailed. A detection mark added on the intermediate recording medium 7 is detected by the mark sensor 33 by driving the first stepping motor 31 and the third DC motor 32 for transporting the intermediate recording medium 7. A voltage applied to the first stepping motor 31 and the third DC motor 32 is designated by a result of detecting a detection mark on the intermediate recording medium 7. Further, a detection mark and a color boundary provided on the ink film 1 is detected by the sensor 25, and then a voltage applied to the first and second DC motors 21 and 22 is designated by a result of detecting a detection mark or a color boundary on the ink film 1.

A frame of the intermediate recording medium 7 is aligned with a head color or a first color of the ink film 1, and then the ink film 1 and the intermediate recording medium 7 is rewound by the first and second supply reels 5 and 8 respectively, wherein the first platen roller 4 is pressed against the thermal head 3 with putting the ink film 1 and the intermediate recording medium 7 between the first platen roller 4 and the thermal head 3. In other words, the ink film 1 and the intermediate recording medium 7 is once transported from the first heating section 500 to the mark sensor 33 direction. Then, an ink image is transferred to the intermediate recording medium 7 while transporting the ink film 1 and the intermediate recording medium 7 to the sensor 25 direction. By passing a predetermined amount of electrical current to the thermal head 3 while transferring the ink image to the intermediate recording medium 7, ink on the ink film 1 is melted or sublimed, and then the ink is transferred to the image sensing layer of the intermediate recording medium 7.

Further, while transferring the ink image to the intermediate recording medium 7, the second take-up reel 9 draws out the intermediate recording medium 7. A small number of voltage, which makes the second take-up roller 9 draw out the intermediate recording medium 7, can be applied so as to relieve excessive back tension applied to the intermediate recording medium 7. Furthermore, it is also acceptable that a clutch is provided in a part of a transmission mechanism from the third DC motor 32 to the second take-up roller 9 so as to completely interrupt load of the third DC motor 32 applied to the second take-up roller 9 while transporting the intermediate recording medium 7 to the second supply reel 8 direction. In addition thereto, the first platen roller 4 is not provided with a driving force. The first platen roller 4 is rotated by a frictional force with the intermediate recording medium 7.

FIG. 5 shows a transfer direction of an ink film in the thermal transfer recording apparatus according to the embodiment of the present invention.

FIG. 6 is a comparative example showing a transfer direction of an ink film in the thermal transfer recording apparatus, wherein the transfer direction is opposite to the transfer direction shown in FIG. 5.

In FIGS. 5 and 6, a shadowed area indicates that ink in the area on the ink film 1 is already transferred to the intermediate recording medium 7. Further, FIGS. 5 and 6 show a case such that the ink film 1 is cyclically coated with three color inks of yellow (Y), magenta (M) and cyan (C). An arrow shown in FIGS. 5 and 6 indicates a transfer direction of ink on the ink film 1.

A sequence of transferring ink on the ink film 1 to the intermediate recording medium 7 is detailed. A transporting method of the ink film 1 shown in FIG. 5 is such that each color ink is transferred to the intermediate recording medium 7 in order of yellow (Y), magenta (M) and cyan (C). In this case, transferring starts with a color in an area close to the first supply reel 5 in order.

Accordingly, in a case of transferring the magenta (M) ink shown in FIG. 5, transferring starts from one end of the magenta (M) ink area adjacent to a cyan (C) ink area of which cyan (C) ink is not transferred to the other end of the magenta (M) ink area adjacent to a yellow (Y) ink area of which yellow (Y) ink is transferred. When the transferring of the magenta (M) ink is finished, the ink film 1 is taken up by the first take-up reel 6 as far as a starting position (Ps) of the cyan (C) ink area close to another yellow (Y) ink area, and then the cyan (C) ink is transferred.

During the above-mentioned process, the intermediate recording medium 7 is transported to a same direction as the ink film 1 is transported. In other words, while transferring the magenta (M) ink, the intermediate recording medium 7 is rewound by the second supply reel 8. When the magenta (M) ink is completed transferring, the intermediate recording medium 7 is taken up by the second take-up reel 9 as may as the intermediate recording medium 7 is rewound by the second supply reel 8 while transferring the magenta (M) ink. The cyan (C) ink is transferred to the intermediate recording medium 7 so as to be laid on an ink image formed by the magenta (M) ink transferred.

As mentioned above, the intermediate recording medium 7 is rewound by the second supply reel 8 driven by the first stepping motor 31 while transferring ink. Therefore, the intermediate recording medium 7 can be stably transported, so that an ink image being transferred is never suffering from irregularity in depth.

While the invention has been described above with reference to specific embodiment and method thereof, it is apparent that many changes, modifications and variations in the arrangement of equipment and devices can be made without departing from the invention concept disclosed herein. For example, the ink film 1 can be advanced to only one direction instead of transporting the ink film 1 reciprocally as mentioned above. In other words, ink can be transferred by replacing the first supply reel 5 and the first take-up reel 6 with each other such that the first supply reel 5 is driven by the second DC motor 22 and the first take-up reel 6 is driven by the first DC motor 21.

FIG. 6 shows a transfer direction of the ink film 1 when the ink film 1 is transported as mentioned above. As shown in FIG. 6, transferring of a magenta (M) ink starts from one end of the magenta (M) ink area adjacent to a first yellow (Y) ink area of which yellow (Y) ink is already transferred to the other end of the magenta (M) ink area adjacent to a cyan (C) ink area of which cyan (C) ink is not transferred. When the transferring of the magenta (M) ink is finished, transferring of the cyan (C) ink starts from a starting position (Ps) of the cyan (C) ink area close to the magenta (M) ink area to a second yellow (Y) ink area of which yellow (Y) ink is not transferred.

As mentioned above, in the case that the first supply reel 5 is driven by the second DC motor 22 and the first take-up reel 6 is driven by the first DC motor 21, a transporting direction of the ink film 1 becomes one direction. Therefore, a driving control of the first and second DC motors 21 and 22 can be simplified. However, as shown in FIG. 6, wrinkling may occur when transferring of each color ink is finished.

When the yellow (Y) ink in the first yellow (Y) ink area is finished transferring, wrinkling occurs in the first yellow (Y) ink area facing toward the magenta (M) ink area of which ink is not transferred yet. When the magenta (M) ink in the magenta (M) ink area is finished transferring, wrinkling occurs in the magenta (M) ink area facing toward the second yellow (Y) ink area of which ink is not transferred yet. Therefore, an ink image may disturbed by the wrinkling at a time when transferring of each color ink is started. On the other hand, in the case of transferring the ink film 1 as shown in FIG. 5, wrinkling always occurs in an area facing toward an ink area of which ink is already transferred. Therefore, an excellent ink image can be formed.

Transporting the intermediate recording medium 7 and the ink film 1 is interrupted when an ink image is formed, wherein an appropriate tension is applied to the intermediate recording medium 7 by applying a certain voltage to the third DC motor 32 while the first stepping motor 31 is kept in a holding state. Then, the first platen roller 4 is separated from the thermal head 3.

While driving the first stepping motor 31 and taking up the intermediate recording medium 7 by the second take-up reel 9, the first stepping motor 31 is stopped at a moment when a predetermined number of pulses generated by the first stepping motor 31 is counted. The number of pulses can be calculated by a driving frequency, which is obtained before forming an ink image, and a distance from the first heating section 500 to the second heating section 300.

The card 2 is transported as far as the nips of the first heat roller 14 and the second platen roller 15. The second platen roller 15 is rotated at almost a same time when the first heat roller 14 is pressed to contact with the intermediate recording medium 7, and the intermediate recording medium 7 is advanced. Then, an ink image on the intermediate recording medium 7 is transferred to the card 2. The first heat roller 13 is separated from the second platen roller 14 when the transferring is finished.

In a case of transferring an ink image to both surfaces of the card 2, the card 2 is peeled off from the intermediate recording medium 7 at the second guide member 30*b* by rewinding the intermediate recording medium 7 together with the card 2 attached to the intermediate recording medium 7. The card 2, which is peeled off from the intermediate recording medium 7, is transported toward the card turning around section 150 through the fourth and third card carrier rollers 110*b* and 110*a*, which rotate to the direction toward the card turning around section 150, and then the card 2 is stopped in the card turning around section 150. The card 2 returned back to the card turning around section 150 is turned upside down by rotating the card turning around section 150 by 180 degrees. Then, the card 2 turned upside down is forwarded to the same process for transferring the ink image.

Further, in the case of transferring the ink image to the both surfaces of the card 2, thermal shrinkage distortion does not occur in the card 2 because the card 2 is heated on both surfaces. Therefore, the second heat roller 130 in the warp correcting section 400 is not necessary to be heated. Finally, the card 2 transferred on both surfaces is exhausted as the same process as mentioned above.

Furthermore, by transferring a transparent image sensing layer, which is not formed with an ink image, a plurality of times, abrasion resistance of an image transferred to the card 2 can be increased. In other words, abrasion resistance of an image on the card 2 can be increased by omitting the process of forming an ink image of the intermediate recording medium 7 in the first heating section 500 after the ink image transferred to the intermediate recording medium 7 is further transferred to the card 2, or by transferring a transparent image sensing layer not formed with an ink image to the card 2 in the second heating section 300 without passing electric current to the thermal head 3.

In this case, the card 2 can be transported as far as a predetermined position by rotating the fourth card carrier roller 110*b* to the direction toward the card turning around section 150, and then the card 2 is transported toward the second heating section 300 once again so as to transfer a transparent image sensing layer as the same manner as the process of transferring an ink image to the both surfaces of the card 2 as mentioned above.

According to an aspect of the present invention, there provided a thermal transfer recording apparatus, which transfers ink on an ink film to a recording medium. The thermal transfer recording apparatus transfers with taking up the recording medium by a supply reel driven by a stepping motor while transferring ink on the ink film to the recording medium. Therefore, the recording medium can be stably transported. Further, it exhibits an excellent effect such that an ink image formed on the recording medium is never suffering from irregularity in depth.

Furthermore, in a case that ink is transferred in accordance with each predetermined recording unit on the ink film and transferring starts from one end of each recording unit close to the supply reel, an ink image can be prevented from disturbance caused by wrinkling appeared on the ink film by heat in a transferring section.

What is claimed is:

1. A thermal transfer recording apparatus comprising:

an ink film coated with ink having meltability or sublimeness on a tape shaped base film;

a supply reel driven by a stepping motor and wound with an unused part of a recording medium in a tape shape;

a take-up reel driven by a DC (direct current) motor winding a used part of said recording medium; and a transferring section for transferring ink on said ink film to said recording medium by heating said ink film and said unused part of said recording medium in contact with each other, wherein said ink is transferred from said ink film to said recording medium while said recording medium is rewound by said supply reel when transferring ink in said transferring section.

2. The thermal transfer recording apparatus in accordance with claim 1, wherein said transferring section transfers ink on said ink film by each predetermined recording unit and starts transferring from one end of each recording unit close to said supply reel.

3. A recording method of a thermal transfer recording apparatus, which comprises an ink film coated with ink having meltability or sublimeness on a tape shaped base film, a supply reel driven by a stepping motor and wound with an unused part of a recording medium in a tape shape, a take-up reel driven by a DC (direct current) motor winding a used part of said recording medium, and a transferring section for transferring ink on said ink film to said recording medium by heating said ink film and said unused part of said recording medium in contact with each other, said recording method comprising steps of:

forwarding said ink film from a first supply reel to a first take-up reel and said intermediate recording medium from a second supply reel to a second take-up reel;

indexing ink on said ink film and a frame of said intermediate recording medium;

adjusting said frame to a head of said ink;

rewinding said ink film and said intermediate recording medium by said first and second supply reels respectively; and transferring said ink to said frame in said transferring section by heating said ink film and said intermediate recording medium in contact with each other while rewinding said ink film and said intermediate recording medium by said first and second supply reels respectively, wherein said steps of forwarding, indexing, adjusting rewinding and transferring are repeated as many times as necessary for the ink to be transferred.

4. The recording method in accordance with claim 3, in said step of transferring, said ink on said ink film is transferred by each predetermined recording unit from one end of each recording unit close to said first supply reel.

* * * * *